(12) United States Patent
Kerns

(10) Patent No.: US 7,225,759 B2
(45) Date of Patent: Jun. 5, 2007

(54) HEAD RESTRAINT FOR ANIMAL CONTROL CHUTE

(76) Inventor: Russell W. Kerns, McCanns Run, Jane Lew, WV (US) 26378

( * ) Notice: Subject to any disclaimer, the term of this patent is extended or adjusted under 35 U.S.C. 154(b) by 125 days.

(21) Appl. No.: 11/047,458

(22) Filed: Jan. 31, 2005

(65) Prior Publication Data

US 2006/0169220 A1 Aug. 3, 2006

(51) Int. Cl.
*A01K 15/04* (2006.01)
(52) U.S. Cl. ........................... 119/732; 119/733
(58) Field of Classification Search ......... 119/729–734
See application file for complete search history.

(56) References Cited

U.S. PATENT DOCUMENTS

| | | | | |
|---|---|---|---|---|
| 2,564,317 A | * | 8/1951 | Whitworth | 119/733 |
| 3,691,998 A | * | 9/1972 | Luinstra | 119/734 |
| 4,513,690 A | * | 4/1985 | Waldron | 119/733 |
| 4,531,478 A | | 7/1985 | Forrest | 119/98 |
| 4,702,200 A | * | 10/1987 | Simington | 119/734 |
| 4,771,737 A | | 9/1988 | Lynch | 119/99 |
| 4,782,791 A | | 11/1988 | Brock | 119/732 |
| 5,109,802 A | | 5/1992 | Priefert | 119/730 |
| 5,184,572 A | | 2/1993 | Meier | 119/99 |
| 5,263,438 A | | 11/1993 | Cummings | 119/734 |
| 5,383,425 A | * | 1/1995 | Bleacher | 119/729 |
| 5,651,333 A | | 7/1997 | Fisher | 119/734 |
| 6,537,145 B1 | * | 3/2003 | Derouin et al. | 452/54 |

* cited by examiner

*Primary Examiner*—Kimberly S. Smith
(74) *Attorney, Agent, or Firm*—Alvin T. Rockhill

(57) ABSTRACT

The present invention provides a head restraint that can be used in conjunction with conventional cattle chutes that are equipped with head gates. This head restraint has a lower neck restraint, an upper neck restraint which is mounted to the lower neck restraint, a nose restraint which is mounted to the lower neck restraint, and a means for affixing the head restraint to the cattle chute. The upper neck restraint is adapted to swivel into a position forming an inverted U-shape over the top of the lower neck restraint, and the nose restraint is adapted to swivel by horizontal motion into a position forming a closed U-shape with the lower neck restraint.

8 Claims, 5 Drawing Sheets

HEAD RESTRAINT FOR ANIMAL CONTROL CHUTE

BACKGROUND OF THE INVENTION

From time to time, all types of cattle require treatment by a farmer, rancher or veterinarian. These treatments may include procedures such as inserting eye drops, administering medicine or vitamins orally, dehorning, attaching ear tags for identifying the particular animal, or attaching and removing insecticide ear tags. In performing such procedures, it is necessary to restrain the head of the animal. Various devices have been developed for temporarily holding and restraining livestock while allowing access to the head of the animal for treatment (see U.S. Pat. No. 5,263,438, U.S. Pat. No. 5,109,802 and U.S. Pat. No. 4,782,791).

Commonly, the cattle are herded into a narrow chute developed to hold the animal while the various treatments are administered. Typically the chutes comprise a pair of movable side walls which prevents the animal from turning around and entrance and exit gates which when closed prevent the animal from moving forward or backward in the chute. The exit gate is generally referred to in the trade as a head gate and it includes a pair of similar gates which move across the chute opening from both sides to a closed position defining a head opening therebetween. Once the cow reaches the proper position in the chute, the pair of head gates is closed around its neck, thus restricting its further movement. By reason of the massive weight of the animal and its excited condition as the head gates close around its neck, frequently there is a substantial impact of the animal with the head gate structure. Due to the substantial weight and strength of cattle, the squeeze chute structure and the head gates are constructed of relatively heavy gauge steel which has relatively no give or deflection. Quite frequently this containment operation results in injury to the animals as they thrash around and impact a very rigid steel structure. Cattle squeeze chutes of this type have been commercially available for many years for use by farmers, ranchers or veterinarians.

Even though conventional head restraints are effective in many respects for restraining animals in order to perform many procedures, conventional head restraints do not provide adequate restraint to perform many procedures on the head of an animal. Conventional restraints allow the cow to move its head from side to side or up and down, making the performance of these procedures difficult. To facilitate the performance of procedures on the heads of cattle, typically a bull lead is inserted into nostrils of the animal and is used to hold the animal's head in a downward orientation. Bull leads clamp against the flesh between the animal's nostrils and pinch tighter by pulling on a rope which is typically attached to the bull lead. The rope attached to the bull lead is frequently tied to a heavy object such as a concrete block or tied to a fixed position on the head gate which is designed for that purpose. The use of the bull lead is painful for the animal, frequently causing it to cry and squeal. When a bull lead is used as a head restraint, the animal frequently struggles, making the application of eye drops or other procedures being done on the head of the animal difficult. The more the animal struggles, the longer the procedure takes. Frequently, in the application of eye drops, as the cow moves its head around, a significant amount of eye drops miss the eye and are lost. During dehorning or ear tagging, it is desirable for the animal's head to remain still in order to minimize the amount of pain or discomfort experienced by the animal.

It would be highly desirable to have a more humane means for restraining the heads of cattle that are being treated. Animal care providers would also readily welcome an easier means for treating the heads of cattle which would reduce the amount of time spent struggling with the animal. Finally, it would be desirable to have a faster way to restrain cattle coming through the chute and a means for providing a greater level of stability to the head so that eye drops and other medication could be supplied more accurately to avoid loss of medication. A more effective means for restraining the heads of cattle would, of course, also be beneficial in performing other procedures, such as dehorning or attaching tags to ears, more accurately.

SUMMARY OF THE INVENTION

The present invention provides a head restraint that can be used in conjunction with conventional cattle chutes that are equipped with head gates. Head restraints of this invention can be integrated into new chutes at the time they are manufactured or can be affixed to existing chutes. The head restraint apparatus of this invention provides the advantages of being humane by causing little or no discomfort to the cattle being restrained. Cattle being treated also tends to remain calm while being restrained utilizing the device of this invention as compared to conventional restraint procedures, such as the employment of a bull lead. It offers much easier and faster means for providing care to positions on the head of the animal. Its implementation can accordingly lead to reduction in human labor requirements associated with treating a herd of cattle and generally leads to savings in medication by virtue of being able to more accurately apply eye drops, ointments, and powdered medications to the eyes of a cow having a very stabilized head as compared to loss of eye drops when dealing with a struggling animal that is jerking its head around during the procedure. The head restraint of this invention can also be beneficially utilized in administering hypodermic injections of medication into the necks of cattle. Shots in the neck can be given much more easily, quickly, and accurately to an animal that is being restrained with the head restraint of this invention to prevent the animal's neck from moving or jerking at the time that the injection is being administered. This greatly reduces the risk of injury to the animal and the person administering the shot and also reduces the possibility of bending or breaking the hypodermic needle.

The present invention more specifically discloses a head restraint for utilization in conjunction with a cattle chute, said head restraint being comprised of a lower neck restraint, an upper neck restraint which is mounted to the lower neck restraint, a nose restraint which is mounted to the lower neck restraint, and a means for affixing the head restraint to the cattle chute, wherein the upper neck restraint is adapted to swivel into a position forming an inverted U-shape over the top of the lower neck restraint, and wherein the nose restraint is adapted to swivel by horizontal motion into a position forming a closed U-shape with the lower neck restraint.

The subject invention also reveals an improved head gate on a cattle squeeze chute for examination or treatment of cattle, the chute having a longitudinally extending box shaped structure with entry and exit ends on the structure, the head gate being attached to the exit end of the structure; the head gate comprising: a rigid frame having a horizontal top frame member, a horizontal bottom frame member, a first side frame member, and a second side frame member; a pair of doors pivotally mounted to the bottom frame member, the top frame member including a slot means which receives the upper ends of said doors, guiding their opening and closing movement within the plane of said head gate frame; an actuating means attached to said doors for opening and closing the door around the head of the cattle; and a head restraint which is comprised of a lower neck restraint, wherein the lower neck restraint extends from the first vertical frame member to the second vertical frame member, an upper neck restraint which is mounted to the lower neck restraint, a nose restraint which is mounted to the lower neck restraint, and a means for affixing the head restraint to the cattle chute, wherein the upper neck restraint is adapted to swivel into a position forming an inverted U-shape over the top of the lower neck restraint, and wherein the nose restraint is adapted to swivel by horizontal motion into a position forming a closed U-shape with the lower neck restraint.

The present invention further discloses a process for examination or treatment of cattle which comprises: (1) driving the cattle into a cattle squeeze chute equipped with the head restraint of this invention; (2) closing the doors of the head gate around the head of the cattle; (3) closing the upper neck restraint over the neck of the cattle; (4) closing the nose restraint over the nose of the cattle; (5) locking the upper neck restraint and the nose restraint into closed positions to firmly restrain the head of the cattle; (6) carrying out the desired procedure on the cattle while the cattle is in the restrain position; (7) unlocking the nose restraint and the upper neck restraint; (8) opening the nose restraint and the upper neck restraint; and the doors of the head gate to release the head of the cattle; and (9) driving the cattle out of the cattle squeeze chute through the exit end.

DETAILED DESCRIPTION OF THE INVENTION

The head restraint of this invention is designed for utilization in conjunction with standard cattle squeeze chutes. It is particularly useful when used in conjunction with a squeeze chute having a head gate for restraining animals, particularly cattle, including, but not necessary limited to, cows, steer, bull and oxen. Also for purposes of this invention, the term cattle is deemed to also include buffalo or bison and other similar animals.

A cattle squeeze chute equipped with a head gate that can be utilized in conjunction with this invention is described in U.S. Pat. No. 5,263,438, the teachings of which are incorporated herein in their entirety. The head gates described in U.S. Pat. No. 5,263,438 are equipped with a biasing means attaching the head gate frame to the cattle squeeze chute structure which permits the head gate frame to move a limited distance in the longitudinal direction from the chute structure whereby the impact and possible injury of cattle moving longitudinally through the chute equipped with the head gate is diminished. Such a biasing means can optionally be utilized in conjunction with cattle squeeze chutes employed in accordance with this invention, but such a biasing means is not required for operability of the present invention. Another head gate design which includes a pair of animal neck-engaging yokes mounted for sliding movement on the top and bottom of the head gate frame is described in U.S. Pat. No. 5,109,802, the teachings of which are incorporated herein by reference in their entirety.

Figure 1:
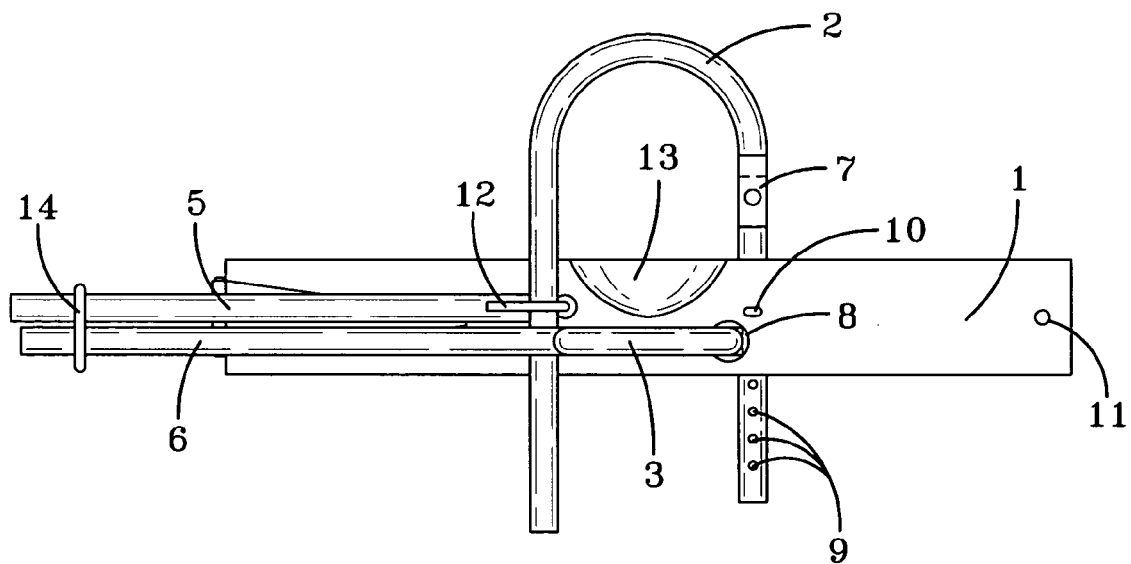
FIG. 1 is a front view of the head restraint of the present invention wherein the upper neck restraint and the nose restraint are in the closed positions.
Figure 3:
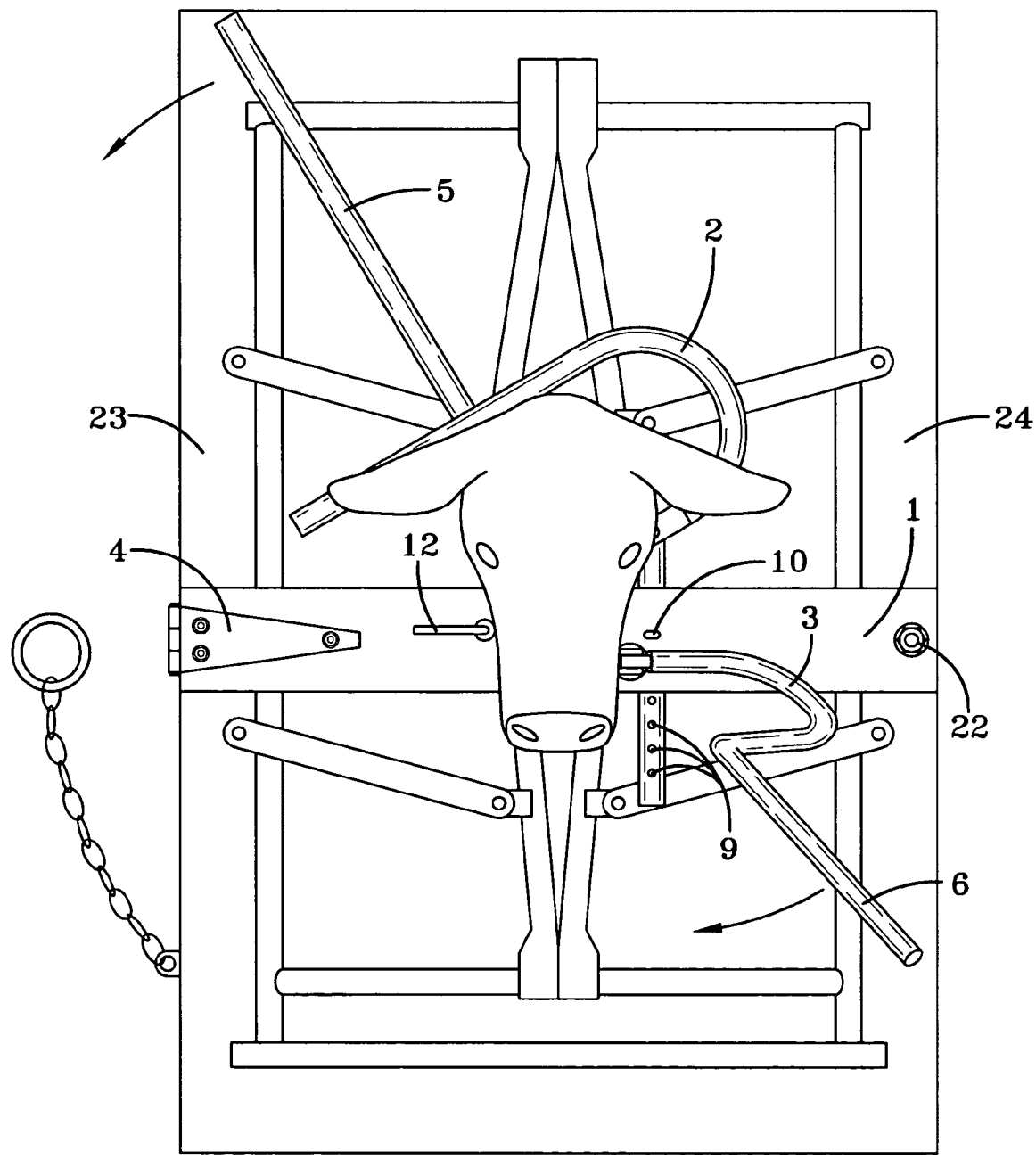
FIG. 3 is a front view of a cow in the head restraint of the present invention wherein the upper neck restraint and the nose restraint are in the open positions, with said head restraint attached to a conventional squeeze gate structure.

The head restraint of this invention as shown in FIG. 1 includes a lower neck restraint 1, an upper neck restraint 2, and a nose restraint 3. The lower neck restraint is designed to extend horizontally across the front of the head gate and will generally extend from the first side frame member 23 to the second side frame member 24 as depicted in FIG. 3. The lower neck restraint can be made of wood, metal, or a strong and relatively rigid polymeric material. For instance, the lower neck restraint can be a wooden two inch by six inch board having a length sufficient to reach horizontally from the first side frame member to the second side frame member of the head gate. The lower neck restraint can also be comprised of steel or aluminum in cases where weight reduction and corrosion resistance is being sought. In one embodiment of this invention, a neck rest contour 13 will be carved or molded into the lower neck restraint to more comfortably accommodate the necks of animals being restrained.

Figure 2:
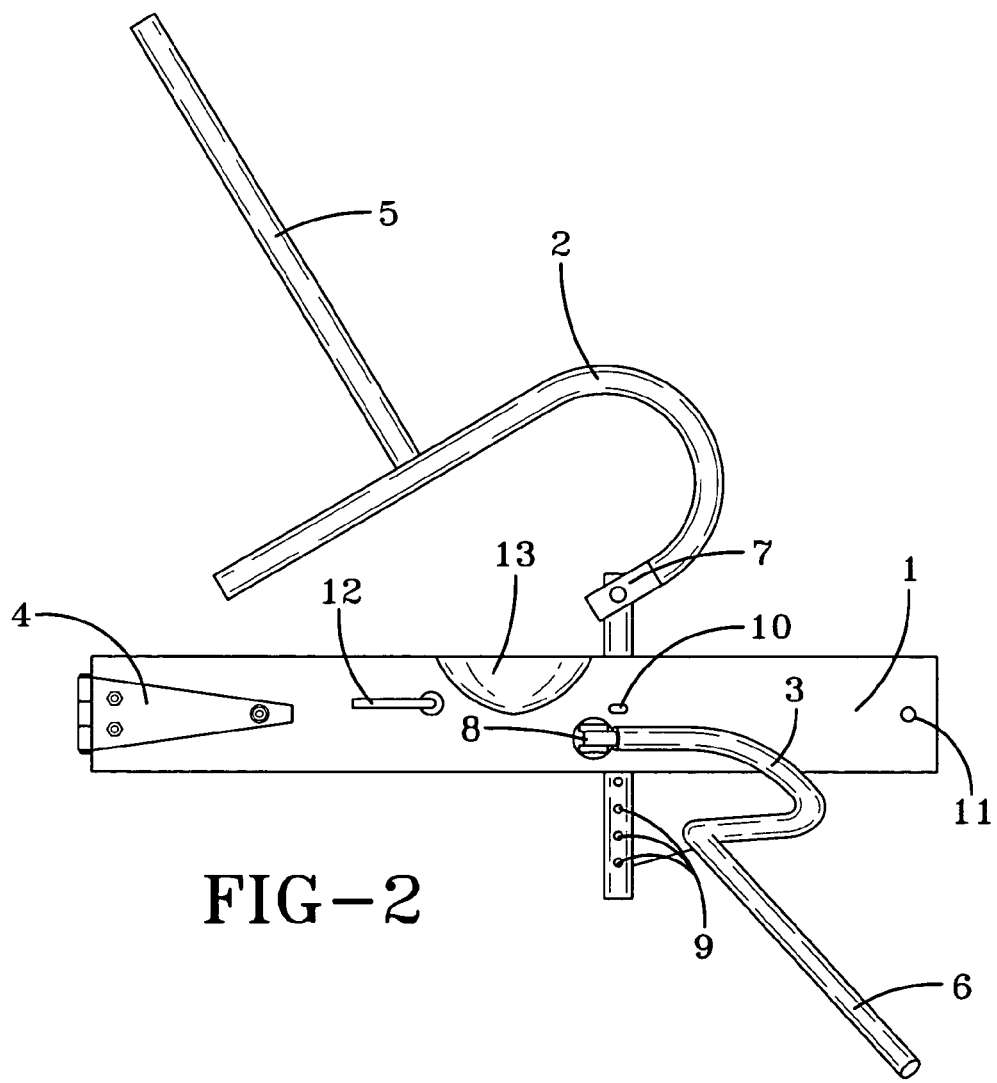
FIG. 2 is a front view of the head restraint of the present invention wherein the upper neck restraint and the nose restraint are in the open positions.

An upper neck restraint 2 will be mounted to the lower neck restraint 1. The upper neck restraint 2 will be adapted to swivel into a position forming an inverted U-shape over the top of the lower neck restraint 1 as depicted in FIG. 1. When the upper neck restraint is in the closed position as depicted in FIG. 1, the closed inverted U will be of sufficient size to accommodate the neck of the animal being restrained. The upper neck restraint 2 will normally be affixed to the lower neck restraint 1 through an upper neck restraint hinge 7 which allows the upper neck restraint 2 to rotate from an open position for receiving cattle as depicted in FIG. 2 to a closed position for restraining the movement of animals as depicted in FIG. 1. The upper neck restraint hinge 7 will preferably be mounted to the lower neck restraint 1 in a manner whereby size adjustments can be made to accommodate animals of varying size. This can be accomplished by pinning the upper neck restraint into place as desired through an appropriate upper neck restraint adjustment hole 9 utilizing the upper neck restraint adjustment pin 10. The upper neck restraint will typically be comprised of metal such as steel or aluminum. In the closed position, the upper neck restraint 2 will preferably be held in place by an upper neck restraint stabilizer 12. The upper neck restraint stabilizer 12 will typically be a metal bar extending outwardly from the lower neck restraint 1 and will be curved, typically to about 90°, so that in the closed position the upper neck restraint 2 can fit snugly between the lower neck restraint 1 and upper neck restraint stabilizer 12. An upper neck restraint handle 5 will typically be affixed to the upper neck restraint to provide leverage in moving the upper neck restraint into the closed position over the neck of an animal.

Figure 4:
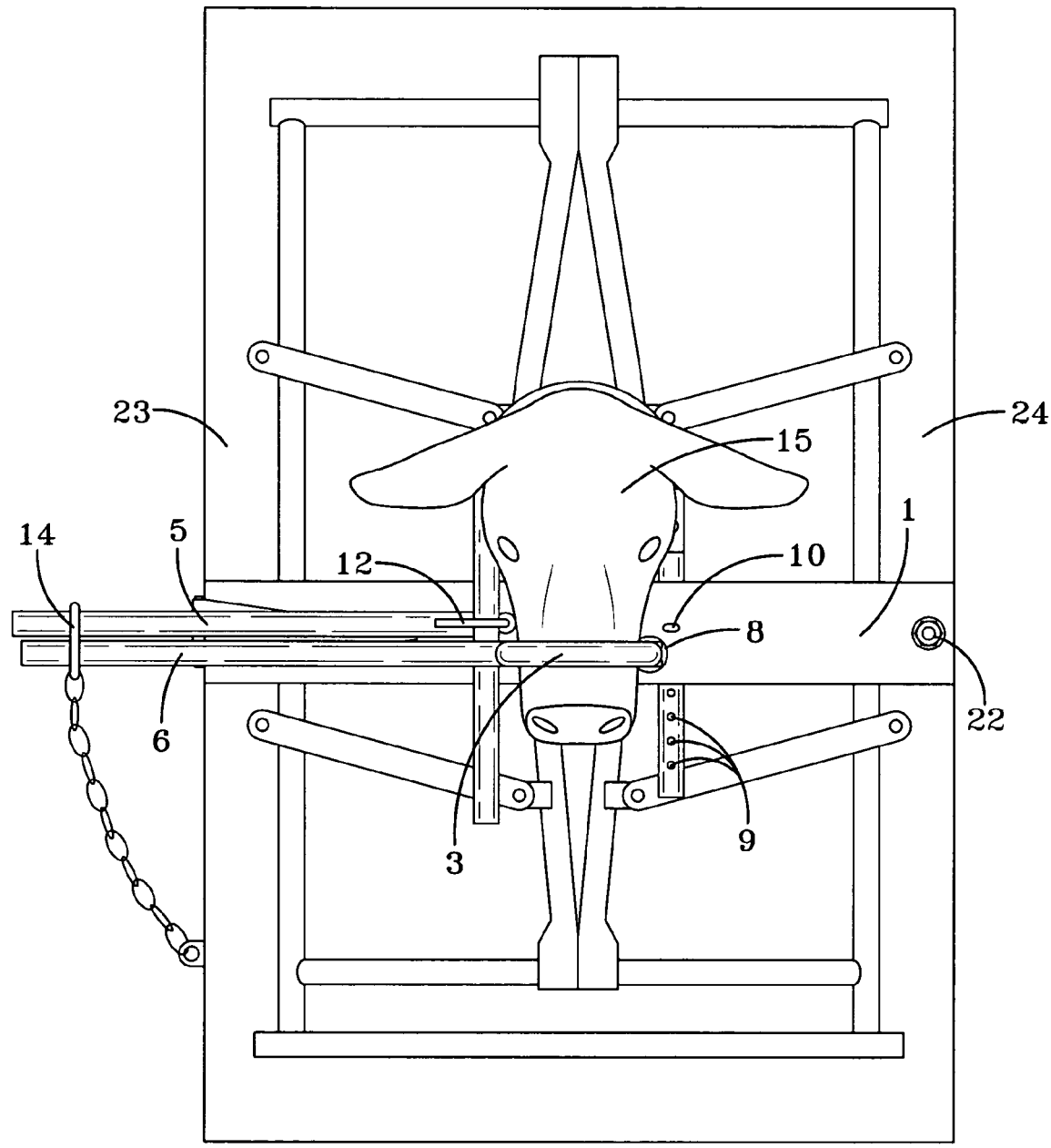
FIG. 4 is a front view of a cow in the head restraint of the present invention wherein the upper neck restraint and the nose restraint are in the closed positions, with said head restraint attached to a conventional squeeze gate structure.

The nose restraint 3 will typically be pivotally mounted to the lower neck restraint 1 as depicted in FIG. 2 wherein a nose restraint hinge 8 is used to affix the nose restraint 3 to the lower neck restraint 1. The nose restraint hinge allows the nose restraint to move from an open position as depicted in FIGS. 2 and 3 to a closed position as depicted in FIGS. 1 and 4. The nose restraint 3 will typically include a nose restraint handle 6 to provide leverage in pushing the animal's nose into the closed position to firmly restrain the animal. The nose restraint can optionally be padded with a soft material so as to be more comfortable for the animal. The upper neck restraint handle 5 and the nose restraint handle 6 can also be covered with a soft material, such as a rubber grip, to make it easier and more comfortable for farmer or rancher to use. The lower neck restraint will typically be affixed to a cattle squeeze chute through a chute attachment hinge 4 as shown in FIG. 2 and FIG. 3. The chute attachment hinge 4 will be designed to allow the head restraint to swing out of the way to allow cattle to exit the chute after opening the head gate doors. The head restraint will typically lock into a closed position utilizing a locking means for tightly affixing the lower neck restraint 1 to the frame of the head gate or cattle squeeze chute. This can be accomplished by utilizing a chute lock nut 22 as depicted in FIG. 3 and FIG. 4. However, any suitable means for conveniently but temporarily locking the lower neck restraint into the closed position across the exit end of the cattle squeeze chute can be employed.

The upper neck restraint 2 and the nose restraint 3 will typically be locked into the closed position to securely restrain cattle being treated. This can be accomplished by any number of mechanical means that will securely hold the upper neck restraint 2 and the nose restraint 3 into the closed positions. The upper neck restraint/nose restraint lock mechanism 14 depicted in FIG. 4 is simply a metal ring that is slipped over the ends of the upper neck restraint handle 5 and nose restraint handle 6. As depicted in FIG. 4, the upper neck restraint handle and nose restraint handle are held firmly together by the ring which acts as the upper neck restraint/nose restraint lock mechanism 14. Additionally, the upper neck restraint/nose restraint lock mechanism 14 can be held down by affixing a chain connected to the upper neck restraint/nose restraint lock mechanism 14 and a fixed point on the frame of the cattle squeeze chute to inhibit movement of the upper neck restraint 2 and nose restraint 3. Since the upper neck restraint handle 5 and the nose restraint handle 6 provide significant mechanical leverage with regard to movement by the animal such a means for locking the upper neck restraint 2 and nose restraint 3 into closed positions is extremely effective. However, the upper neck restraint 2 and nose restraint 3 could also be locked into place utilizing some other means including the farmer or rancher or their assistant manually holding the upper neck restraint 2 and the nose restraint 3 in closed orientations. FIG. 4 depicts a cow 15 which is locked into a restrained position for examination or a treatment or procedure to be carried out on the animal. FIG. 3 shows the cow before or after being restrained with the lower neck restraint 2 and the nose restraint 3 being in open, unlocked positions.

Figure 5:
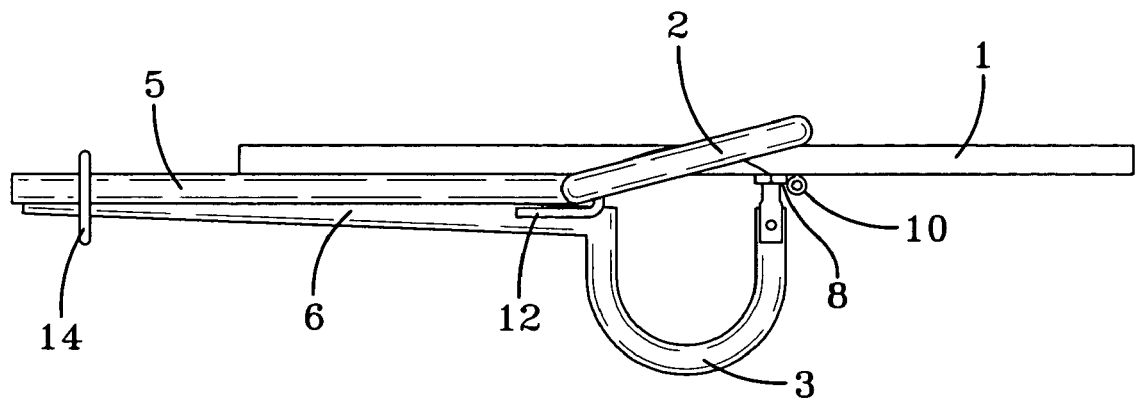
FIG. 5 is a top view of the head restraint of the present invention wherein the upper neck restraint and the nose restraint are in the closed positions.

FIG. 5 is a top view of the head restraint of this invention with the upper neck restraint 2 and nose restraint 3 being in the closed positions. The upper neck restraint handle 5 and nose restraint handle 6 are shown as being held together by the upper neck restraint/nose restraint lock mechanism 14 which is in the form of a metal ring. The upper neck restraint handle 5 is shown as being held firmly in proximity to the lower neck restraint 1 by the upper neck restraint stabilizer 12.

Figure 6:
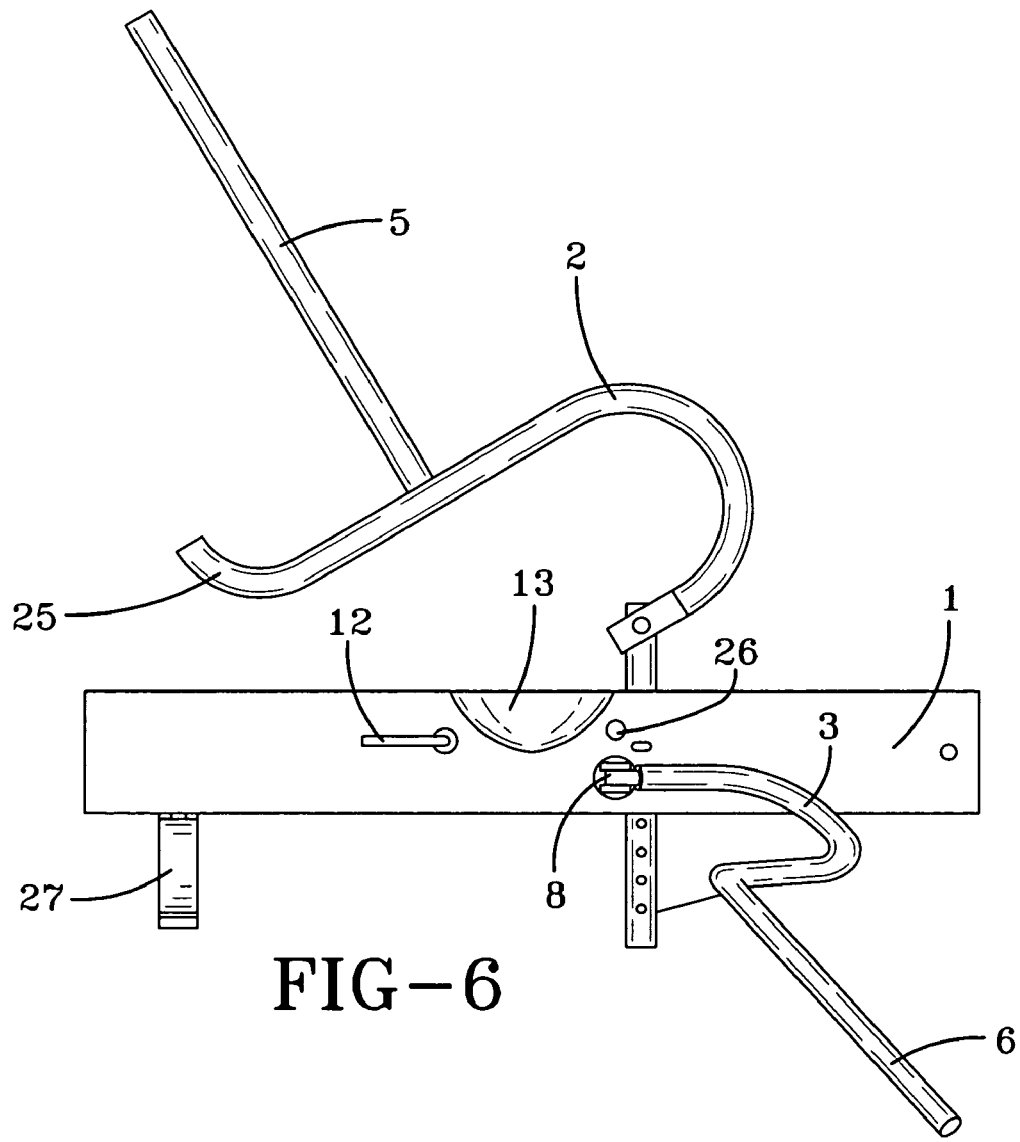
FIG. 6 is a front view of a preferred embodiment of the head restraint of the present invention wherein the upper neck restraint and the nose restraint are in the open positions and wherein the head restraint is equipped with locking latch for the upper neck restraint and nose restraint.
Figure 7:
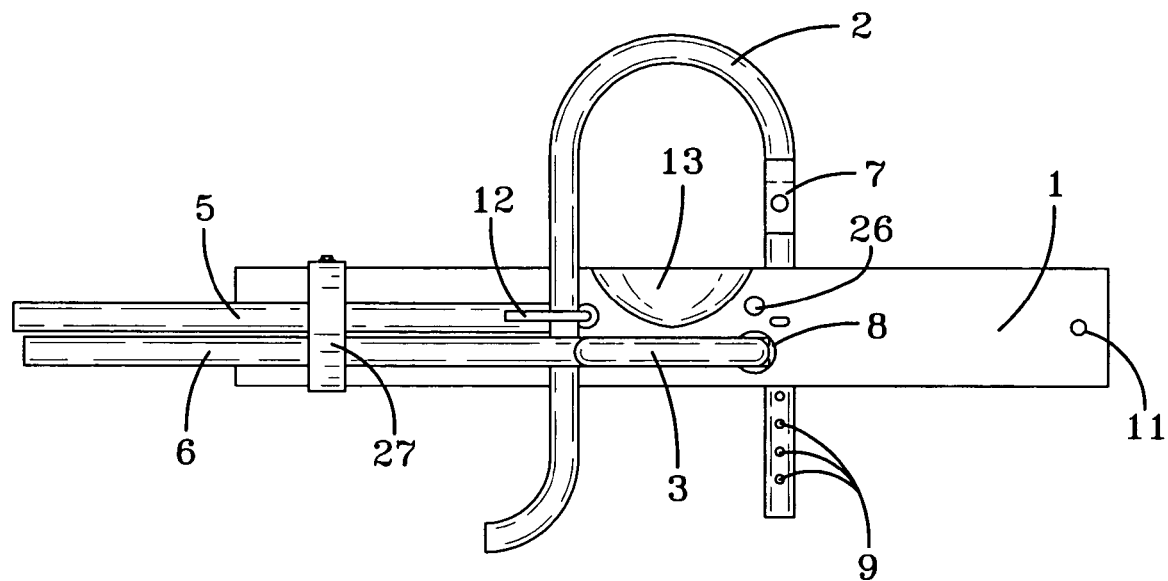
FIG. 7 is a front view of a preferred embodiment of the head restraint of the present invention wherein the upper neck restraint and the nose restraint are in the closed positions and wherein the head restraint is equipped with locking latch for the upper neck restraint and nose restraint.

FIG. 6 and FIG. 7 depict several preferred embodiments of the present invention. In one such embodiment the upper neck restraint 2 is curved toward the outside of the head restraint at its detached end 25. This curvature of the detached end 25 of the upper neck restraint 2 keeps the detached end 25 of the upper neck restraint 2 well away from the eyes cattle that are being locked into the restrained position. It prevents the eye of the animal from being injured in the event that the animal jerks its head or jumps in the direction of the detached end 25 of the upper neck restraint 2. In other words, the curvature eliminates the possibility of the animal from poking itself in the eye by jerking into the detached end 25 of the upper neck restraint 2.

The embodiment of the invention depicted in FIG. 6 and FIG. 7 also includes an alternative attachment point 26 for the nose restraint hinge 8 used to affix the nose restraint 3 to the lower neck restraint 1. The alternative attachment point 26 can be used in cases where small animals are being restrained. In any case, the alternative attachment point 26 can simply be a hole in the lower neck restraint 1 into which the nose restraint hinge 8 can be securely locked or pinned.

FIG. 6 and FIG. 7 also show a locking bracket 27 which can be used to hold the upper neck restraint handle 5 and the nose restraint handle 6 in the closed positions. In FIG. 6 the locking bracket 27, the upper neck restraint 2, and the nose restraint 3 are in open positions. In FIG. 7 the locking bracket 27 is pivotally mounted to the lower neck restraint 1. The locking bracket 27 is shown in FIG. 7 in the closed position over the upper neck restraint handle 5 and the nose restraint handle 6. The locking bracket holds (locks) the upper neck restraint 2 and the nose restraint 3 in the closed positions to firmly restrain an animal being treated.

Figure 8:
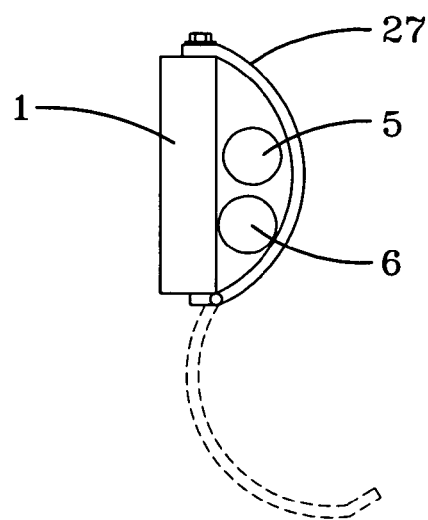
FIG. 8 is a side view of the locking bracket for the upper neck restraint and nose restraint wherein the locking latch is holding the upper neck restraint and the nose restraint in the closed positions.

FIG. 8 is a side view of the locking bracket 27 for the upper neck restraint handle 5 and nose restraint handle 6 wherein the locking bracket (latch) is holding the upper neck restraint 2 and the nose restraint 3 in the closed positions. As can be seen, the upper neck restraint handle 5 and the nose restraint handle 6 are held in close proximity to the lower neck restraint 1 by the locking bracket 27. The locking bracket 27 is pivotally mounted to the lower neck restraint 1 and can be swung open downwardly to release the upper neck restraint handle 5 and the nose restraint handle 6 to move the upper neck restraint 2 and the nose restraint 3 into open positions.

The head restraint of this invention is of particular benefit in the examination or treatment of the heads and/or necks of cattle. It can be used for a wide number of procedures including, but not limited to, inserting eye drops, administering a hypodermic injection into the neck of the cattle, administering ointments or powders to the heads of cattle, administering medicine or vitamins orally, dehorning, attaching ear tags for identifying the particular animal, or attaching and removing insecticide ear tags. However, the head restraint of this invention should not be used in procedures that are being preformed on lower extremities of the cattle, such as the feet.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

The head restraint depicted in FIG. 1 and FIG. 2 was affixed to a cattle squeeze chute which was equipped with a conventional head gate. Cattle were driven into the cattle chute and locked into the restrained position as shown in FIG. 4. Eye drops were inserted into the eyes of the animals while their head was being restrained as depicted in FIG. 4. During the treatment process, the animals remained calm and did not struggle significantly. In utilizing the head restraint of this invention, time was saved by virtue of the fact that the cows could be quickly and easily locked into the restrained position. Additionally, virtually no eye drops were lost because the farmer could accurately insert the drops into the animals' eyes. This is in contrast to the conventional method of the prior art where the animals are simply restrained by the head gate but have considerable ability to move their heads up and down and from side to side. Additionally, a bull lead is typically utilized in an attempt to adequately restrain the heads of the animals in the conventional procedures of the prior art. In such prior art procedures, the animals typically cry, squeal and struggle throughout the entire procedure. Accordingly, the utilization of the head restraint of this invention is presumable much more humane for the animals because the animals treated utilizing the head restraint of this invention did not cry, squeal or struggle.

EXAMPLE 2

Medications are commonly injected into the necks of cattle by farmers, ranchers, and veterinarians to treat diseases and as a health maintenance procedure. The head restraint of this invention can be beneficially utilized in administering such hypodermic injections into the necks of cattle. For instance, the head restraint depicted in FIG. 1 and FIG. 2 can be affixed to a cattle squeeze chute which is equipped with a conventional head gate. Cattle can then be driven into the cattle chute. The doors of the head gate can then be closed around the heads of the cattle. Then the upper neck restraint can be closed over the upper neck of the animal being treated with the nose restraint being closed over the nose of the animal. By virtue of the fact that the handles on the upper neck restraint and the nose restraint are relatively long, the care provider has a great deal of leverage in forcing the animal's head and neck into the restrained position. The upper neck restraint and the nose restraint are then locked into the closed position to firmly restrain the animal as shown in FIG. 4.

The animal can then be injected with a medicine using a hypodermic needle and syringe while it is being restrained as depicted in FIG. 4. During the period that the animal's head is being restrained, the hypodermic injection can be given to the neck of the animal. During the procedure the animals typically remains calm and do not struggle. After the hypodermic injection has been administered the nose restraint and the upper neck restraint are unlocked. Then, the nose restraint and the upper neck restraint are swung into open positions and the doors of the head gate are opened to release the head of the animal. Then, the lower neck restraint is swung away from the exit end door of the cattle squeeze chute and the exit end door of the cattle squeeze chute is opened. The animal is then driven out of the cattle squeeze chute through the exit end door. At this point, the exit end door can be closed and another animal can be driven into the squeeze chute to repeat the procedure.

In utilizing the head restraint of this invention, time is saved by virtue of the fact that the animals can be quickly and easily locked into the restrained position without encountering a struggle with the animals. Additionally, utilization of the head restraint of this invention virtually eliminates the possibility of bending or breaking hypodermic needles due to the animal suddenly jerking as the needle is inserted into the animal or during the period that the medication is being injected. This is in contrast to the conventional method of the prior art where the animals are simply restrained by the use of a head gate and bull lead, but where the animals still has considerable ability to move their heads and necks up and down and from side to side. In such conventional procedures it is not uncommon for needles to bend or break in cases where the animal jerks during the procedure. On occasion the farmer or rancher administering the injection by the prior art method accidentally pricks himself with the hypodermic needle. Such accidents and injury to the human administering the hypodermic injection and injuries to the animals receiving the shot can be virtually eliminated by utilizing the head restraint of this invention.

A bull lead is typically utilized in an attempt to adequately restrain the heads of the cattle in the conventional procedures of the prior art. Because the bull lead tightly pinches the nostrils of the animals being treaded or examined it causes the animal a level of discomfort that typically causes the animal to cry, squeal and struggle throughout the entire procedure. The head restraint of this invention eliminates the need to employ a bull lead while conducting procedures on the heads and/or necks of cattle. Accordingly, the utilization of the head restraint of this invention is presumable much more humane for the animals because the need for a bull lead is eliminated and consequently the animals treated do not typically cry, squeal or struggle.

While certain representative embodiments and details have been shown for the purpose of illustrating the subject invention, it will be apparent to those skilled in this art that various changes and modifications can be made therein without departing from the scope of the subject invention.

What is claimed is:

1. A head restraint for utilization in conjunction with a cattle chute, said head restraint being comprised of a lower neck restraint, an upper neck restraint which is directly mounted to the lower neck restraint, a nose restraint which is mounted to the lower neck restraint, and a means for affixing the head restraint to the cattle chute, wherein the lower neck restraint includes a contour defining a neck rest, wherein the lower neck restraint has a substantially linear top surface profile across its entire length, wherein the upper neck restraint is adapted to swivel into a position forming an inverted U-shape over the top of the lower neck restraint, wherein the nose restraint is adapted to swivel by horizontal motion into a position forming a closed U-shape with the lower neck restraint, and wherein the head restraint is interconnected in the absence of the cattle chute.

2. A head restraint as specified in claim 1 wherein the upper neck restraint includes a neck restraint handle.

3. A head restraint as specified in claim 1 wherein the nose restraint includes a nose restraint handle.

4. A head restraint as specified in claim 1 which is further comprised of an upper neck restraint stabilizer which is affixed to the lower neck restraint.

5. A head restraint as specified in claim 4 wherein the upper neck restraint is adapted to swivel into a position forming a closed U-shape with the lower neck restraint wherein the upper neck restraint is stabilized with respect to horizontal motion by the upper neck restraint stabilizer.

6. A head restraint as specified in claim 1 wherein the upper neck restraint is padded with a soft material.

7. A head restraint as specified in claim 1 wherein the nose restraint is padded with a soft material.

8. A head restraint as specified in claim 1 where the cattle chute has an exit end onto which a head gate is affixed, and wherein the lower neck restraint is adapted to extend horizontally across the exit end of the cattle chute and the head gate.

* * * * *